US012001751B2

(12) United States Patent
Meursing et al.

(10) Patent No.: US 12,001,751 B2
(45) Date of Patent: Jun. 4, 2024

(54) SHARED DATA AND COLLABORATION FOR HEAD-MOUNTED DEVICES

(71) Applicant: Apple Inc., Cupertino, CA (US)

(72) Inventors: Marinus Meursing, Poway, CA (US); David A. Schmuck, Raymore, MO (US); Brian S. Lau, Sacramento, CA (US); Jeremy C. Franklin, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/214,448

(22) Filed: Jun. 26, 2023

(65) Prior Publication Data

US 2023/0350633 A1 Nov. 2, 2023

Related U.S. Application Data

(63) Continuation of application No. 16/791,861, filed on Feb. 14, 2020, now abandoned.

(Continued)

(51) Int. Cl.
*G06F 3/147* (2006.01)
*G06F 3/01* (2006.01)
(Continued)

(52) U.S. Cl.
CPC .............. *G06F 3/147* (2013.01); *G06F 3/012* (2013.01); *G06F 3/017* (2013.01); *G06V 20/20* (2022.01); *H04N 23/90* (2023.01)

(58) Field of Classification Search
CPC .......... G06F 3/012; G06F 3/017; G06V 20/20
See application file for complete search history.

(56) References Cited

U.S. PATENT DOCUMENTS 9,520,002 B1 12/2016 Gavrilliuc
9,582,933 B1 2/2017 Mosterman
(Continued)

FOREIGN PATENT DOCUMENTS

CN 102884490 1/2013
CN 103493106 A 1/2014
(Continued)

OTHER PUBLICATIONS

European Office Action from European Patent Application No. 20721367.9, dated Aug. 16, 2023, 5 pages.
(Continued)

*Primary Examiner* — Sepehr Azari
(74) *Attorney, Agent, or Firm* — BAKERHOSTETLER (57) ABSTRACT

A system can include head-mounted devices that collaborate to process views from cameras of the respective head-mounted devices and identify objects from different perspectives and/or objects that are within the view of only one of the head-mounted devices. Sharing sensory input between multiple head-mounted devices can complement and enhance individual units by interpreting and reconstructing objects, surfaces, and/or an external environment with perceptive data from multiple angles and positions, which also reduces occlusions and inaccuracies. As more detailed information is available at a specific moment in time, the speed and accuracy of object recognition, hand and body tracking, surface mapping, and/or digital reconstruction can be improved. Such collaboration can provide more effective and efficient mapping of space, surfaces, objects, gestures and users.

17 Claims, 3 Drawing Sheets

Related U.S. Application Data (60) Provisional application No. 62/836,006, filed on Apr. 18, 2019.

(51) Int. Cl.
 G06V 20/20 (2022.01)
 H04N 23/90 (2023.01)

(56) References Cited

U.S. PATENT DOCUMENTS

| | | | |
|---|---|---|---|
| 10,007,350 | B1 | 6/2018 | Holz et al. |
| 10,430,147 | B2 | 10/2019 | Vembar |
| 10,955,665 | B2 | 3/2021 | Salter |
| 11,112,859 | B2* | 9/2021 | Lyren ............... H04W 4/023 |
| 2012/0249741 | A1* | 10/2012 | Maciocci ............ G06T 19/006 |
| | | | 348/51 |
| 2013/0286004 | A1 | 10/2013 | McCulloch |
| 2013/0293580 | A1 | 11/2013 | Spivack |
| 2013/0342564 | A1 | 12/2013 | Kinnebrew |
| 2014/0052555 | A1 | 2/2014 | Macintosh |
| 2014/0354685 | A1* | 12/2014 | Lazarow ............ G06T 19/006 |
| | | | 345/633 |
| 2016/0109940 | A1* | 4/2016 | Lyren ................. G06F 3/011 |
| | | | 463/2 |
| 2017/0262154 | A1 | 9/2017 | Black et al. |
| 2017/0287218 | A1 | 10/2017 | Nuemberger |
| 2017/0315774 | A1 | 11/2017 | Meerbeek |
| 2018/0018933 | A1* | 1/2018 | Rehmeyer ............ G02B 27/017 |
| 2018/0314484 | A1 | 11/2018 | Pahud et al. |
| 2018/0341386 | A1 | 11/2018 | Inomata |
| 2019/0056791 | A1 | 2/2019 | Holz et al. |
| 2019/0114802 | A1* | 4/2019 | Lazarow ............ H04W 56/001 |
| 2019/0213754 | A1* | 7/2019 | Lee ..................... G06V 10/757 |
| 2019/0221035 | A1 | 7/2019 | Clark |
| 2019/0272674 | A1 | 9/2019 | Comer |
| 2020/0026922 | A1 | 1/2020 | Pekelny |
| 2020/0042263 | A1* | 2/2020 | Iyer ..................... G06F 3/1454 |
| 2021/0240279 | A1* | 8/2021 | Harviainen ........... G06F 3/017 |

FOREIGN PATENT DOCUMENTS

| | | |
|---|---|---|
| CN | 103562968 A | 2/2014 |
| CN | 106502388 | 3/2017 |
| CN | 106662925 | 5/2017 |
| CN | 108919951 | 11/2018 |
| CN | 212112404 U | 2/2020 |
| CN | 111201797 A | 5/2020 |
| WO | WO 2019/074771 | 4/2019 |

OTHER PUBLICATIONS

Chinese Office Action from Chinese Patent Application No. 20208003734.5, dated Oct. 27, 2023, 15 pages including English language translation.

* cited by examiner

SHARED DATA AND COLLABORATION FOR HEAD-MOUNTED DEVICES

CROSS-REFERENCE TO RELATED APPLICATIONS

This application is a continuation of U.S. application Ser. No. 16/791,861, entitled "SHARED DATA AND COLLABORATION FOR HEAD-MOUNTED DEVICES," filed Feb. 14, 2020, which claims the benefit of U.S. Provisional Application No. 62/836,006, entitled "SHARED DATA AND COLLABORATION FOR HEAD-MOUNTED DEVICES," filed Apr. 18, 2019, the entirety of which is incorporated herein by reference.

TECHNICAL FIELD

The present description relates generally to head-mounted devices, and, more particularly, to a system of head-mounted devices that share view and other information.

BACKGROUND

A head-mounted device can be worn by a user to display visual information within the field of view of the user. The head-mounted device can be used as a virtual reality (VR) system, an augmented reality (AR) system, and/or a mixed reality (MR) system. A user may observe outputs provided by the head-mounted device, such as visual information provided on a display. The display can optionally allow a user to observe an environment outside of the head-mounted device. Other outputs provided by the head-mounted device can include audio output and/or haptic feedback. A user may further interact with the head-mounted device by providing inputs for processing by one or more components of the head-mounted device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mounted devices, such as head-mounted displays, headsets, visors, smartglasses, head-up display, etc., can perform a range of functions that are managed by the components (e.g., sensors, circuitry, and other hardware) included with the wearable device.

Head-mounted devices can be equipped with a wide range of outward and inward facing sensors. These sensors can recognize and track objects, surfaces, and user gestures such as hand and body movements. The functionality of such sensors can be limited by factors such as component cost, device size, device weight, heat generation, available computing power, and/or occlusion due to the device being in a specific location relative to other objects or users.

Multiple head-mounted devices can operate in concert to leverage their combined sensory input and computing power, as well as those of other external devices to improve sensory perception, mapping ability, accuracy, processing workload, and thermals mitigation. For example, sharing sensory input between multiple head-mounted devices can complement and enhance individual units by interpreting and reconstructing objects, surfaces, and/or an external environment with perceptive data from multiple angles and positions, which also reduces occlusions and inaccuracies. As more detailed information is available at a specific moment in time, the speed and accuracy of object recognition, hand and body tracking, surface mapping, and/or digital reconstruction can be improved. By further example, such collaboration can provide more effective and efficient mapping of space, surfaces, objects, gestures and users.

The burden of processing can be shared between multiple devices. Rather than having each individual device independently tracking, mapping, and/or processing the same objects, multiple devices can work together to distribute the workload. This allows each device to focus on specific but complementary tasks, such as a specific area in a shared room, relaying hand and body tracking of different users and from different perspectives, and/or relaying sound recorded by a head-mounted device that is close to a source of audio to other head-mounted devices that are farther away. The distribution of workload and sharing of processed information can lead to greatly improved power management and heat generation.

These and other embodiments are discussed below with reference to FIGS. 1-6. However, those skilled in the art will readily appreciate that the detailed description given herein with respect to these Figures is for explanatory purposes only and should not be construed as limiting.

Figure 1:
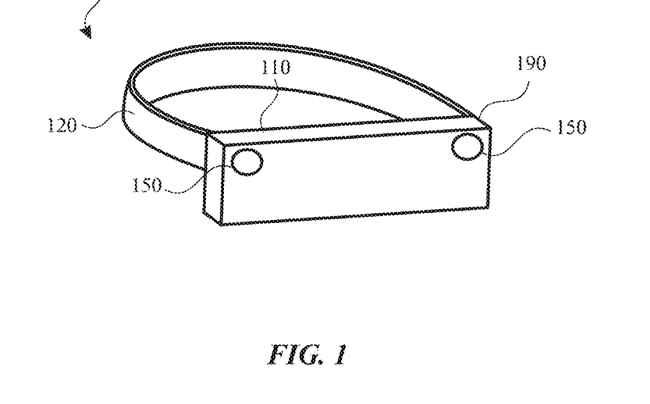
FIG. 1 illustrates a perspective view of a head-mounted device, according to some embodiments of the present disclosure.

According to some embodiments, for example as shown in FIG. 1, a head-mounted device 100 includes a frame 190 that is worn on a head of a user. The frame 190 can be positioned in front of the eyes of a user to provide information within a field of view of the user. The frame 190 can provide nose pads or another feature to rest on a user's nose. The frame 190 can be supported on a user's head with the securement element 120. The securement element 120 can wrap or extend along opposing sides of a user's head. The securement element 120 can include earpieces for wrapping around or otherwise engaging or resting on a user's ears. It will be appreciated that other configurations can be applied for securing the head-mounted device 100 to a user's head. For example, one or more bands, straps, belts, caps, hats, or other components can be used in addition to or in place of the illustrated components of the head-mounted device 100. By further example, the securement element 120 can include multiple components to engage a user's head.

The frame 190 can provide structure around a peripheral region thereof to support any internal components of the frame 190 in their assembled position. For example, the frame 190 can enclose and support various internal components (including for example integrated circuit chips, processors, memory devices and other circuitry) to provide computing and functional operations for the head-mounted device 100, as discussed further herein. Any number of components can be included within and/or on the frame 190 and/or the securement element 120 and be operably connected to each other.

The frame 190 can include and/or support one or more cameras 150. The cameras 150 can be positioned on or near an outer side of the frame 190 to capture images of views external to the head-mounted device 100. The captured images can be used for display to the user or stored for any other purpose. Additionally or alternatively, other sensors, input devices, and/or output devices can be positioned at or on an exterior side of the frame 190.

A display 110 can optionally transmit light from a physical environment for viewing by the user. Such a display 110 can include optical properties, such lenses for vision correction based on incoming light from the physical environment. Additionally or alternatively, a display 110 can provide information as a display within a field of view of the user. Such information can be provided to the exclusion of a view of a physical environment or in addition to (e.g., overlaid with) a physical environment. Additionally or alternatively, other sensors, input devices, and/or output devices can be positioned at or on an interior side of the frame 190.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
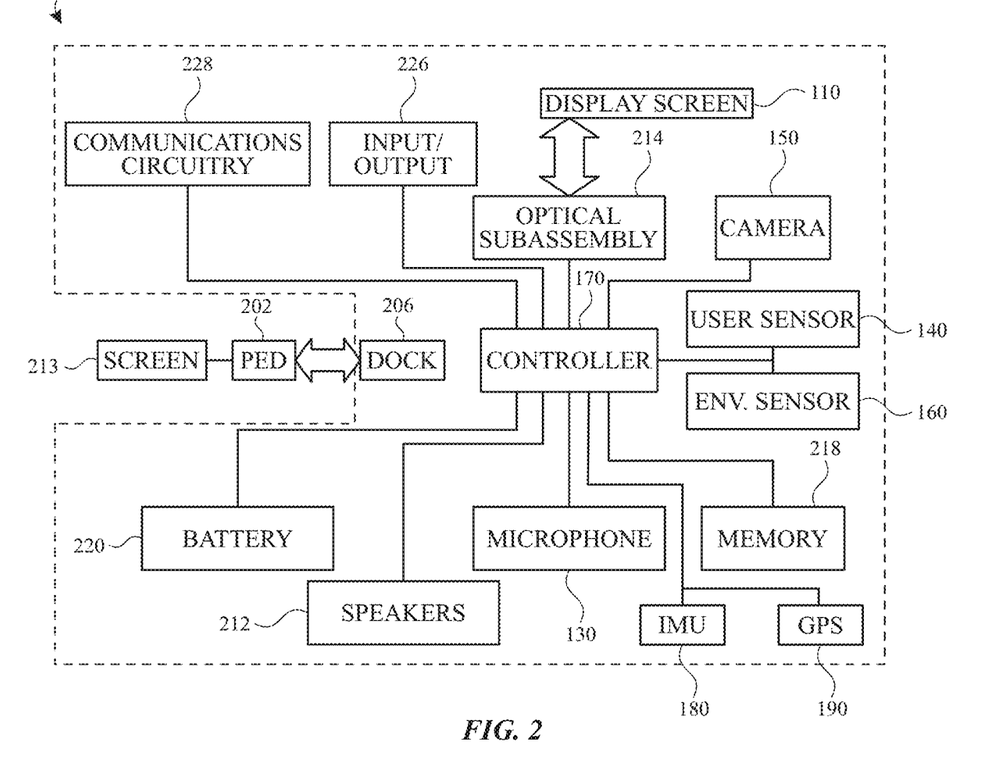
FIG. 2 illustrates a block diagram of a head-mounted device, in accordance with some embodiments of the present disclosure.

Referring now to FIG. 2, components of the head-mounted device can be operably connected to provide the performance described herein. FIG. 2 shows a simplified block diagram of a head-mounted device 100 in accordance with one or more embodiments of the disclosure. It will be appreciated that components described herein can be provided on either or both of a frame and/or a securement element of the head-mounted device 100.

As shown in FIG. 2, the head-mounted device 100 can include a processor 170 with one or more processing units that include or are configured to access a memory 218 having instructions stored thereon. The instructions or computer programs may be configured to perform one or more of the operations or functions described with respect to the head-mounted device 100. The processor 170 can be implemented as any electronic device capable of processing, receiving, or transmitting data or instructions. For example, the processor 170 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 218 can store electronic data that can be used by the head-mounted device 100. For example, the memory 218 can store electrical data or content such as, for example, audio and video files, documents and applications, device settings and user preferences, timing and control signals or data for the various modules, data structures or databases, and so on. The memory 218 can be configured as any type of memory. By way of example only, the memory 218 can be implemented as random access memory, read-only memory, Flash memory, removable memory, or other types of storage elements, or combinations of such devices.

The head-mounted device 100 can further include a display 110 for displaying visual information for a user. The display 110 can provide visual (e.g., image or video) output. The display 110 can be or include an opaque, transparent, and/or translucent display. The display 110 may have a transparent or translucent medium through which light representative of images is directed to a user's eyes. The display 110 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mounted device 100 can include an optical subassembly 214 configured to help optically adjust and correctly project the image based content being displayed by the display 110 for close up viewing. The optical subassembly 214 can include one or more lenses, mirrors, or other optical devices.

The head-mounted device 100 can include the camera 150 for capturing a view of an environment external to the head-mounted device 100. The camera 150 can include an optical sensor, such as a photodiode or a photodiode array.

Additionally or alternatively, the camera 150 can include one or more of various types of optical sensors that are arranged in various configurations for detecting user inputs described herein. The camera 150 may be configured to capture an image of a scene or subject located within a field of view of the camera 150. The image may be stored in a digital file in accordance with any one of a number of digital formats. In some embodiments, the head-mounted device 100 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The camera 150 can provide one or more windows (e.g., opening, transmission medium, and/or lens) to transmit light for image capture and/or detection. The window can include a light transmitting material. The window can provide optical effects for the transmitted light. For example, the window can include one or more optical components disposed relative to an image sensor, including, for example, a lens, a diffuser, a filter, a shutter, and the like. It will also be understood that the head-mounted device 100 can include any number of cameras. The cameras can be positioned and oriented to capture different views. For example, one camera can capture an image of an object from one perspective and another camera can capture an image of an object from another perspective. Additionally or alternatively, the other camera can capture an image of an object that is not captured by the first camera.

Additionally or alternatively, the head-mounted device 100 can include one or more environment sensors 160 that are directed to an external environment. Such environment sensors 160 can include any sensor that detects one or more conditions in an environment of the head-mounted device 100. For example, an environment sensor 160 can include an imaging device, a thermal sensor, a proximity sensor, a motion sensor, a humidity sensor, a chemical sensor, a light sensor, and/or a UV sensor. An environment sensor 160 can be configured to sense substantially any type of characteristic such as, but not limited to, images, pressure, light, touch, force, temperature, position, motion, and so on. For example, the environment sensor 160 may be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. The sensor can be used to sense ambient conditions in a neighboring environment.

The head-mounted device 100 can include an inertial measurement unit ("IMU") 180 that provides information regarding a characteristic of the head-mounted device 100, such as inertial angles thereof. For example, the IMU 180 can include a six-degrees of freedom IMU that calculates the head-mounted device's position, velocity, and/or acceleration based on six degrees of freedom (x, y, z, $\theta_x$, $\theta_y$, and $\theta_z$). The IMU 180 can include one or more of an accelerometer, a gyroscope, and/or a magnetometer. Additionally or alternatively, the head-mounted device 100 can detect motion characteristics of the head-mounted device 100 with one or more other motion sensors, such as an accelerometer, a gyroscope, a global positioning sensor, a tilt sensor, and so on for detecting movement and acceleration of the head-mounted device 100. The IMU 180 can provide data to the processor 170 for processing.

The head-mounted device 100 can include one or more user sensors 140 for tracking features of the user wearing the head-mounted device 100. For example, a user sensor 140 can perform facial feature detection, facial movement detection, facial recognition, eye tracking, user mood detection, user emotion detection, voice detection, etc. Such eye tracking may be used to determine a location of information to be displayed on the display 110 and/or a portion (e.g., object) of a view to be analyzed by the head-mounted device 100. By further example, the user sensor 140 can be a bio-sensor for tracking biometric characteristics, such as health and activity metrics. The user sensor 140 can include a bio-sensor that is configured to measure biometrics such as electrocardiographic (ECG) characteristics, galvanic skin resistance, and other electrical properties of the user's body. Additionally or alternatively, a bio-sensor can be configured to measure body temperature, exposure to UV radiation, and other health-related information.

The head-mounted device 100 can include a battery 220, which can charge and/or power components of the head-mounted device 100. The battery 220 can also charge and/or power components connected to the head-mounted device 100, such as a portable electronic device 202, as discussed further herein.

The head-mounted device 100 can include an input/output component 226, which can include any suitable component for connecting head-mounted device 100 to other devices. Suitable components can include, for example, audio/video jacks, data connectors, or any additional or alternative input/output components.

The head-mounted device 100 can include communications circuitry 228 for communicating with one or more servers or other devices using any suitable communications protocol. For example, communications circuitry 228 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 228 can also include an antenna for transmitting and receiving electromagnetic signals.

The head-mounted device 100 can include the microphone 230 as described herein. The microphone 230 can be operably connected to the processor 170 for detection of sound levels and communication of detections for further processing, as described further herein.

The head-mounted device 100 can include the speakers 222 as described herein. The speakers 222 can be operably connected to the processor 170 for control of speaker output, including sound levels, as described further herein.

The head-mounted device 100 can optionally connect to a portable electronic device 202, which can provide certain functions. For the sake of brevity, the portable electronic device 202 will not be described in detail in FIG. 2. It should be appreciated, however, that the portable electronic device 202 may be embodied in a variety of forms including a variety of features, all or some of which can be utilized by the head-mounted device 100 (e.g., input/output, controls, processing, battery, etc.). The portable electronic device 202 can provide a handheld form factor (e.g., small portable electronic device which is light weight, fits in a pocket, etc.). Although not limited to these, examples include media players, phones (including smart phones), PDAs, computers, and the like. The portable electronic device 202 may include a screen 213 for presenting the graphical portion of the media to the user. The screen 213 can be utilized as the primary screen of the head-mounted device 100.

The head-mounted device 100 can include a dock 206 operative to receive the portable electronic device 202. The dock 206 can include a connector (e.g., Lightning, USB, FireWire, power, DVI, etc.), which can be plugged into a complementary connector of the portable electronic device 202. The dock 206 may include features for helping to align the connectors during engagement and for physically coupling the portable electronic device 202 to the head-mounted device 100. For example, the dock 206 may define a cavity for placement of the portable electronic device 202. The dock 206 may also include retaining features for securing portable electronic device 202 within the cavity. The connector on the dock 206 can function as a communication interface between the portable electronic device 202 and the head-mounted device 100.

Figure 3:
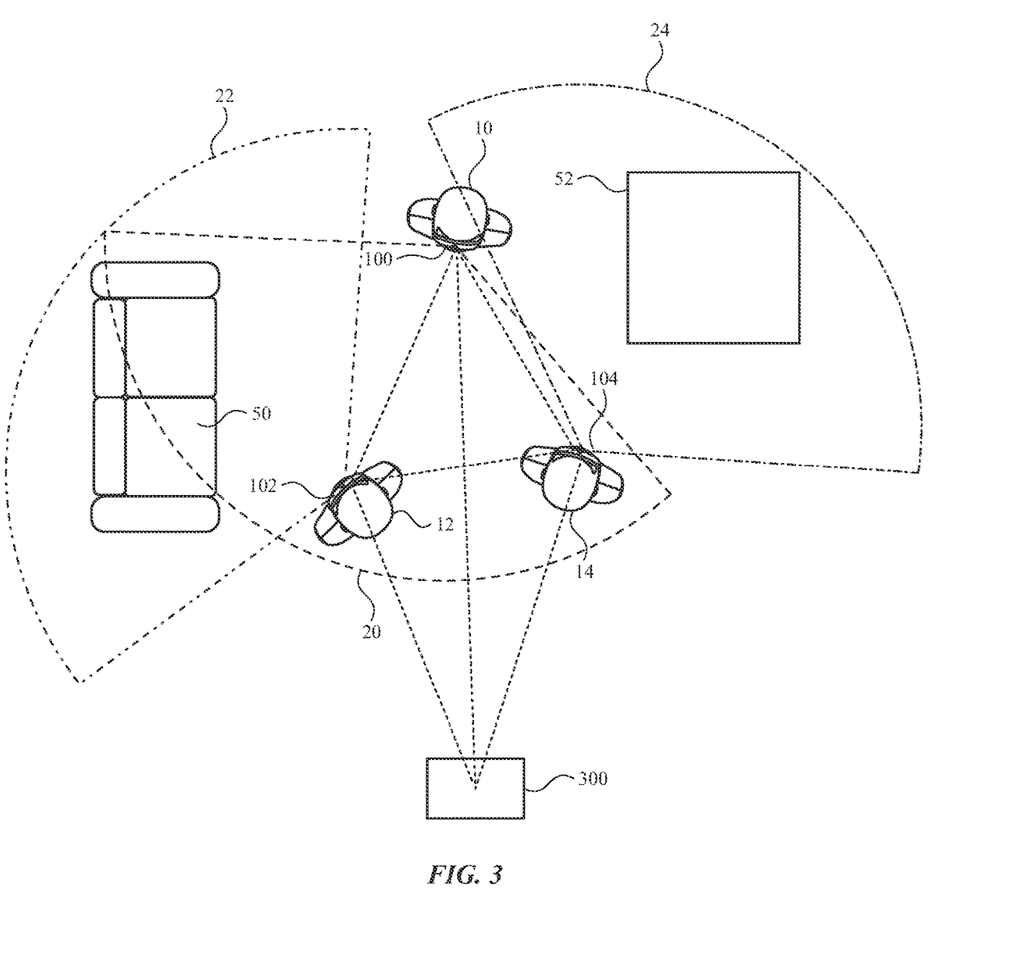
FIG. 3 illustrates an overhead view of a system of head-mounted devices, according to some embodiments of the present disclosure.

Referring now to FIG. 3, multiple users can each be wearing a corresponding head-mounted device that has a field of view. As shown in FIG. 3, within a system 1, a first user 10 can wear a first head-mounted device 100, a second user 12 can wear a second head-mounted device 102, and a third user 14 can wear a third head-mounted device 104. It will be understood that the system 1 can include any number of users and corresponding head-mounted devices. The head-mounted devices can be provided with communication links between any pair of head-mounted devices and/or other devices (e.g., external device 300) for sharing data.

The first head-mounted device 100 can have a first field of view 20, the second head-mounted device 102 can have a second field of view 22, and the third head-mounted device 104 can have a third field of view 24. The fields of view can be of a camera or any other sensor. The fields of view can overlap at least partially, such that an object (e.g., object 50) is within a field of view of more than one of the head-mounted devices. For example, the first head-mounted device 100 can be arranged to capture a field of view 20 that contains the object 50, and the second head-mounted device 102 can be arranged to capture a second field of view 22 that also contains the object 50. The first head-mounted device 100 and the second head-mounted device 102 can each be arranged to capture the object 50 from a different perspective, such that different portions, surfaces, sides, and/or features of the object 50 can be observed from the different head-mounted devices. As such, each of the first head-mounted device 100 and the second head-mounted device 102 can capture, process, and/or generate different data relating to the object 50. Where such data relating to the object 50 can be used by either of the head-mounted devices, the data can be shared with that head-mounted device.

One or more of the fields of view 20, 22, and 24 be arranged so that at least a portion of one field of view is not within a field of view of another. Accordingly, an object (e.g., object 52) can be within a field of view of one of the head-mounted devices but outside a field of view of another one of the head-mounted devices. As such, a head-mounted device (e.g., the third head-mounted device 104) can capture, process, and/or generate data regarding the object and transmit such data to one or more other head-mounted devices (e.g., the first head-mounted device 100 and/or the second head-mounted device 102). Where such data relating to the object 52 can be used by the head-mounted device that does not contain the object 52 within its field of view, the data can be shared with that head-mounted device.

Data relating to the users and the head-mounted devices can also be captured, processed, and/or generated by any one or more of the head-mounted devices. It will be understood that the users themselves can be within a field of view of one of the head-mounted devices and outside a field of view of another one of the head-mounted devices, including the head-mounted device worn by that user. In such cases, data relating to any given user may be more effectively captured by a head-mounted device worn by a user other than the given user. For example, at least a portion of the second user 12, the third user 14, the second head-mounted device 102, and/or the third head-mounted device 104 can be within the first field of view 20 of the first head-mounted device 100. Accordingly, the first head-mounted device 100 can capture, process, and/or generate data regarding the second user 12, the third user 14, the second head-mounted device 102, and/or the third head-mounted device 104 and transmit such data to one or more other head-mounted devices (e.g., the second head-mounted device 102 and/or the third head-mounted device 104). Where such data relating to the user can be used by the head-mounted device that does not contain that user within its field of view, the data can be shared with that head-mounted device.

As further shown in FIG. 3, an external device can be provided with a communication link to one or more of the head-mounted devices. The external device 300 can be any device configured to receive, transmit, capture, process, and/or generate data that is shared between or among head-mounted devices. The external device can be a computing device, a phone, a smartphone, a wearable electronic device, a portable electronic device, a server, a cloud-based device, or a combination thereof. The external device 300 can operate in a manner that is similar to any one of the head-mounted devices described herein, even without being worn by a user. As such, the external device 300 can facilitate communication between head-mounted devices and/or provide processing to reduce the processing load among the head-mounted devices.

Data can be captured by any one of the head-mounted devices and shared between or among other head-mounted devices. For example, multiple head-mounted devices (e.g., the first head-mounted device 100 and the second head-mounted device 102) can capture views of the same object 50. The data captured by each can be insufficient to perform further operations relating to the object 50. Additionally or alternatively, the data captured can be limited by the arrangement of each head-mounted device such that the processing requirement to perform further operations relating to the object 50 can be relatively high for each of the first head-mounted device 100 and the second head-mounted device 102. As such, the data captured can be shared so that a selected one of the first head-mounted device 100 and the second head-mounted device 102 can perform further processing. Because each head-mounted device captures different data, the combination thereof provides the selected one of the head-mounted devices with a greater ability to perform such processing (e.g., greater confidence in identification, more detailed mapping, etc.). Furthermore, the processing requirements of such further operations can also be reduced by delegating the processing task to the selected one of the head-mounted devices and sharing the results with the other one of the head-mounted devices. Additionally or alternatively, the delegation of processing tasks can be shared in a manner that reduces redundancies between or among the head-mounted devices. Additionally or alternatively, the external device 300 can participate in the capturing, processing, and/or generating of data, so that the head-mounted devices can have reduced processing activities. This allows the head-mounted devices to consume less power and generate less heat.

The collection and sharing of captured, processed, and/or generated data between or among head-mounted devices can facilitate effective and efficient operations of one or more of the head-mounted devices. While various examples of such applications are discussed herein, it will be recognized that these examples are given by way of illustration and not limitation, and that various other examples can be implemented with the techniques described herein.

Head-mounted devices can operate in concert to perform object recognition. For example, data can be captured, processed, and/or generated by one or more of the head-mounted devices to determine a characteristic of an object. A characteristic can include an identity, name, type, reference, color, size, shape, make, model, or other feature detectable by one or more of the head-mounted devices. Once determined, the characteristic can be shared and one or more of the head-mounted devices can optionally provide a representation of the object to the corresponding user via a display thereof. Such representations can include any information relating to the characteristic, such as labels, textual indications, graphical features, and/or other information. Additionally or alternatively, a representation can include a virtual object displayed on the display as a substitute for the physical object. As such, identified objects from a physical environment can be replaced and/or augmented with virtual objects.

Head-mounted devices can operate in concert to perform object mapping. For example, data can be captured, processed, and are generated by one or more of the head-mounted devices to map the contours of an object. Each head-mounted device can capture multiple views from different positions and orientations with respect to the object. The combined data can include more views than are captured by either one of the head-mounted devices. Based on this shared data, one or more of the head-mounted devices and/or an external device can perform mapping based operations, such as three-dimensional rendering to produce a model that corresponds to the object. The model can optionally be displayed on one or more of the head-mounted devices as a virtual object displayed as a substitute for the physical object. When the object is further recognized by either of the head-mounted devices, the model based on the mapping can be displayed.

Head-mounted devices can operate in concert to perform gesture recognition. For example, data can be captured, processed, and are generated by one or more of the head-mounted devices where the data includes captured views of a user. Gesture recognition can involve the detection of a position, orientation, and/or motion of a user (e.g., limbs, hands, fingers, etc.). Such detections can be enhanced when based on views captured from multiple perspectives. Such perspectives can include views from separate head-mounted devices, including head-mounted devices worn by a user other than the user making the gesture. Data based on these views can be shared between or among head-mounted devices and/or an external device for processing and gesture recognition. Any processing data can be shared with the head-mounted device worn by the user making the gesture and corresponding actions can be performed.

Figure 4:
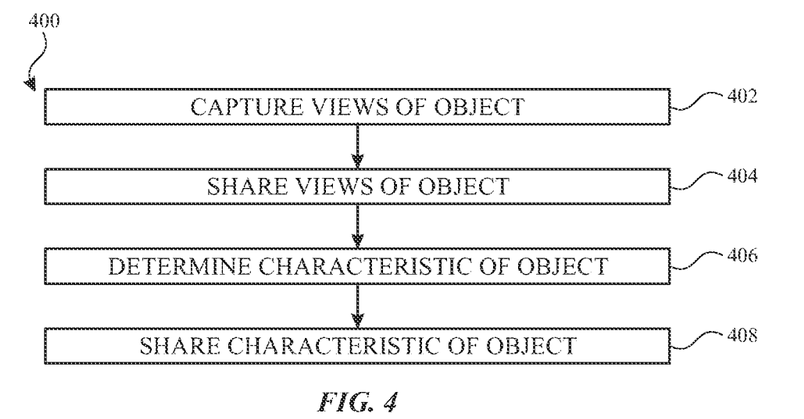
FIG. 4 illustrates a method of operating head-mounted devices to determine and share characteristics of an object, in accordance with some embodiments of the present disclosure.
Figure 5:
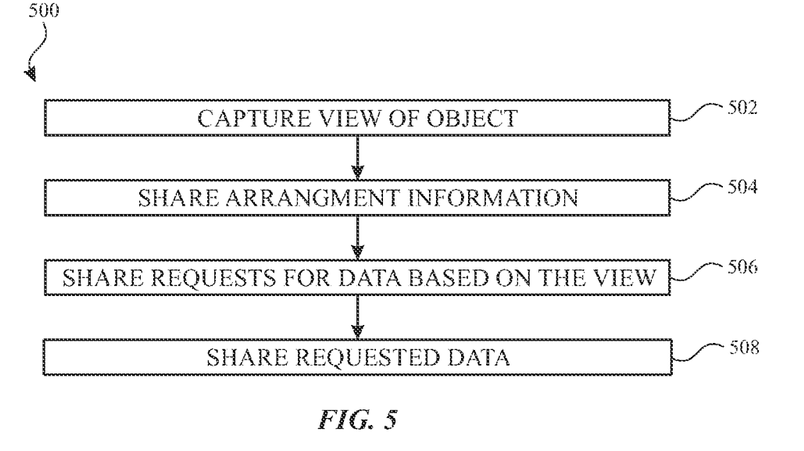
FIG. 5 illustrates a method of operating head-mounted devices to coordinate data sharing based on requested views of an object, in accordance with some embodiments of the present disclosure.
Figure 6:
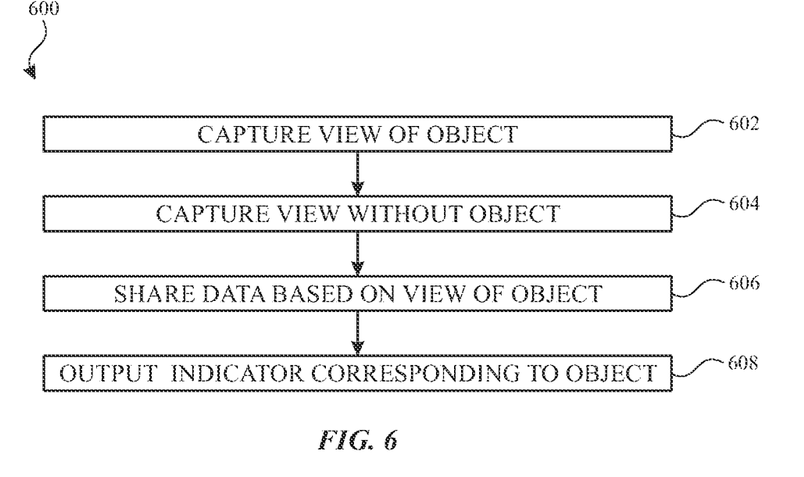
FIG. 6 illustrates a method of operating head-mounted devices to share data based on objects not with a view of at least one of the head-mounted devices, in accordance with some embodiments of the present disclosure.

Referring now to FIGS. 4-6, methods of operating a system including multiple head-mounted devices and/or an external device are provided to achieve the results described herein.

As shown in FIG. 4, a method 400 is provided for operating head-mounted devices to determine and share characteristics of an object. It will be understood that the method 400 illustrated in FIG. 4 is merely an example, and that a method can be performed with additional steps and/or fewer steps than those illustrated in FIG. 4. It will be recognized that initiation, coordination, performance, and/or delegation of operations within the method 400 can be performed by any of the head-mounted devices and/or the external device.

In operation 402, one or more of the head-mounted devices captures one or more views of an object. In operation 404, the head-mounted devices share the one or more views of the object, so that at least one of the head-mounted devices and/or an external device has the combined data. In operation 406, the selected head-mounted device and/or external device having the combined data can process the data to determine a characteristic of the object based on the data. Additionally or alternatively, any other information relating to the object can be determined, as discussed herein. In operation 408, the selected head-mounted device and/or external device can share the characteristic or other information with at least one other head-mounted device, which can include a head-mounted device providing views of the object.

As shown in FIG. 5, a method 500 is provided for operating head-mounted devices to coordinate data sharing based on requested views of an object. It will be understood that the method 500 illustrated in FIG. 5 is merely an example, and that a method can be performed with additional steps and/or fewer steps than those illustrated in FIG. 5. It will be recognized that initiation, coordination, performance, and/or delegation of operations within the method 500 can be performed by any of the head-mounted devices and/or the external device.

In operation 502, one or more of the head-mounted devices captures one or more views of an object. In operation 504, one or more of the head-mounted devices shares information relating to its arrangement. Such information can include location, orientation, motion, and/or whether an object is within a view of the given head-mounted device. The arrangement can be with respect to an object and/or another head-mounted device. Additionally or alternatively, the head-mounted device can provide an indicator that is detectable by another head-mounted device. For example, one head-mounted device can provide a signal (e.g., electromagnetic signal from an antenna) that is detectable by another head-mounted device. By further example, one head-mounted device can be optically or otherwise detectable by another head-mounted device. The arrangement information can be used to determine whether a given head-mounted device has, within its view, the object. The arrangement information can be provided with or without captured views. For example, a first head-mounted device can capture a view of an object and receive arrangement information relating to a second head-mounted device. Based on the arrangement information, the first head-mounted device can determine whether the second head-mounted device is arranged in a manner that allows it to capture views of the same object. Where the first head-mounted device determines that the second head-mounted device is arranged in a manner that allows it to capture views of the same object, it can proceed to request additional data from the second head-mounted device. For example, in operation 506, the first head-mounted device can request data from the second head-mounted device when it has determined it to be capable of capturing a view of the object. In operation 508, the second head-mounted device captures one or more views of the object and shares the corresponding data with the first head-mounted device. Operation 508 can be similar to operation 404 discussed above, and the method 500 can further include other operations from the method 400, such as operations 406 and 408.

It will be recognized that data shared between head-mounted devices need not be captured, processed, and/or generated at the same time or within any given time frame. Data can be collected (e.g., by an external device) by a first head-mounted device and subsequently accessed by a second head-mounted devices when appropriate. For example, the second head-mounted device can be at a given location (e.g., based on GPS data) and/or near a given object and request data relating to the location and/or the object. Such data (e.g., mapping) may be in existence at the time of the request. For example, at an earlier point in time, a first head-mounted device may have been at or near the same location and/or object, and the first head-mounted device may have already captured, processed, and/or generated data relating to the location and/or object. It will be recognized that such data can also be based on the operations of multiple head-mounted devices, as discussed above with respect to method 400. Such data can be stored for later reference by another head-mounted device. For example, when the second head-mounted device requests the data, the first head-mounted device and/or an external device in communication with the first head-mounted device can provide the requested data. The user wearing the second head-mounted device can then have an experience that is enhanced by the earlier data provided by the first head-mounted device. Furthermore, the second head-mounted device can be spared from an amount of processing previously performed by the first head-mounted device, thereby reducing power consumption and heat generation. It will be recognized that the data can be stored at an external device (e.g., cloud-based server) that is accessible to multiple head-mounted devices. Any one of the head-mounted devices can request and receive data based on its location and/or a nearby object and any available data corresponding thereto.

It will be recognized that data captured, processed, and/or generated by a given head-mounted device can be later retrieved by the same head-mounted device. For example, in the example above, the first head-mounted device and the second head-mounted device can be the same device at different points in time. As such, data relating to a location and/or object can be captured, processed, and/or generated by the head-mounted device in a first session. Upon returning to the same location and/or object during a second session, the head-mounted device can retrieve the data (e.g., from an external device). Thus, the head-mounted device can be spared from repeating an amount of processing that was previously performed, thereby reducing power consumption and heat generation.

As shown in FIG. 6, a method 600 is provided for operating head-mounted devices to share data based on objects not with a view of at least one of the head-mounted devices. It will be understood that the method 600 illustrated in FIG. 6 is merely an example, and that a method can be performed with additional steps and/or fewer steps than those illustrated in FIG. 6. It will be recognized that initiation, coordination, performance, and/or delegation of operations within the method 600 can be performed by any of the head-mounted devices and/or the external device. In operation 602, a first head-mounted device captures one or more views of an object. In operation 604, a second head-mounted device captures a view that does not contain the object. The lack of the object within the view can be based on the arrangement (e.g., position and/or orientation) of the second head-mounted device, an occlusion that blocks the object from view, and/or an operation of the second head-mounted device. In operation 606, the first head-mounted device and/or the external device shares data corresponding to the one or more views of the object with the second head-mounted device. It will be recognized that such data can be captured, processed, and/or generated by the operations of multiple head-mounted devices, as discussed above with respect to method 400. In operation 608, the second head-mounted device can output an indicator based on the data and/or corresponding to the object. For example, the second head-mounted device can display or otherwise output a notification to the user regarding the object's existence, identity, location, or other characteristic.

The above method can be applied to allow a head-mounted device to output a representation of an object that is not within visible to the user. For example, an object blocked from view but visible to another user can be represented based on data from the other user. This allows a user to become aware of objects that would otherwise to unknown to the user. For example, a head-mounted device may provide warnings or other indicators that alert the user to objects and/or events that are not within the field of view of the user or the corresponding head-mounted device.

The above method can be applied to facilitate gesture recognition based on the operation of multiple head-mounted devices. For example, a head-mounted device may have limited views for gestures made by a user wearing the head-mounted device. Such gestures may be partially or completely blocked from view based on the user's head position. Other head-mounted devices in the vicinity of the user making the gestures can capture the views of the gestures and share corresponding data as further discussed herein.

Accordingly, embodiments of the present disclosure provide a system of head-mounted devices that collaborate to process views from cameras of the respective head-mounted devices and identify objects from different perspectives and/or objects that are within the view of only one of the head-mounted devices. Multiple head-mounted devices can operate in concert to leverage their combined sensory input and computing power, as well as those of other external devices to improve sensory perception, mapping ability, accuracy, processing workload, and thermals mitigation. For example, sharing sensory input between multiple head-mounted devices can complement and enhance individual units by interpreting and reconstructing objects, surfaces, and/or an external environment with perceptive data from multiple angles and positions, which also reduces occlusions and inaccuracies. As more detailed information is available at a specific moment in time, the speed and accuracy of object recognition, hand and body tracking, surface mapping, and/or digital reconstruction can be improved. By further example, such collaboration can provide more effective and efficient mapping of space, surfaces, objects, gestures and users.

Various examples of aspects of the disclosure are described below as clauses for convenience. These are provided as examples, and do not limit the subject technology.

Clause A: a head-mounted device comprising: a camera for capturing a view including an object; a communication element for receiving data from an additional head-mounted device comprising an additional camera; and a processor configured to: determine a characteristic of the object based on the view captured by the camera and the data from the additional head-mounted device; and transmit, to the additional head-mounted device, a signal indicating the characteristic of the object.

Clause B: a head-mounted device comprising: a camera for capturing a view including an object; a communication element for receiving data from an additional head-mounted device comprising an additional camera; and a processor configured to: determine a characteristic of the object based on the view captured by the camera and the data from the additional head-mounted device; and transmit, to the additional head-mounted device, a signal indicating the characteristic of the object.

Clause C: a head-mounted device comprising: a first camera for capturing a first view including an object; a communication element for receiving data from an additional head-mounted device that comprises a second camera; and a processor configured to: determine whether the second camera of the additional head-mounted device is arranged to capture a second view of the object, the second view being different than the first view; transmit, to the additional head-mounted device, a request for the data, the data being based on the second view captured by the second camera; and receive the data from the additional head-mounted device.

Clause D: a system comprising: one or more of the head-mounted devices of clause A, B, or C.

One or more of the above clauses can include one or more of the features described below. It is noted that any of the following clauses may be combined in any combination with each other, and placed into a respective independent clause, e.g., clause A, B, C, or D.

Clause 1: the first head-mounted device further comprises a display configured to display a representation corresponding to the characteristic of the object.

Clause 2: the representation comprises a virtual object that is generated based on the characteristic of the object.

Clause 3: the characteristic comprises an identity of the object.

Clause 4: an external device in communication with the first head-mounted device and the second head-mounted device.

Clause 5: the data is transmitted from the first head-mounted device to the second head-mounted device via the external device, and the signal is transmitted from the second head-mounted device to the first head-mounted device via the external device.

Clause 6: the external device is configured to: determine the characteristic of the object based on the first view and the second view; and transmit, to the first head-mounted device and the second head-mounted device, an additional signal indicating an additional characteristic of the object.

Clause 7: the external device is configured to: receive the data comprising the first view; store the data comprising the first view until the second camera captures the second view including the object; and transmit the data to the second head-mounted device.

Clause 8: the processor is further configures to: determine a characteristic of the object based on the first view and the second view; and transmit, to the additional head-mounted device, a signal indicating the characteristic of the object.

Clause 9: the additional head-mounted device is within the first view; and determining whether the second camera is arranged to capture the second view of the object is based on the first view.

Clause 10: a sensor configured to detect a position and an orientation of the additional head-mounted device with respect to the object.

Clause 11: the communication element is configured to receive an indication of a position and an orientation of the additional head-mounted device with respect to the object.

Clause 12: the second view is captured before the first view and the data is stored on an external device.

Clause 13: the processor is further configured to transmit to the external device a signal indicating a location of the head-mounted device; the request for the data is transmitted to the external device; and the data is received from the external device.

Clause 14: the object is a portion of a body of a user wearing the head-mounted device.

Clause 15: the processor is further configured to detect a gesture of the user based on the data.

Clause 16: the object is blocked from the first view by an occlusion between the first camera and the object.

Clause 17: the indicator comprises a virtual object that is generated based on the data.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mounted device comprising:
   a camera for capturing a first view including a first physical object;
   a display;
   a communication element for receiving data from an additional head-mounted device comprising an additional camera for capturing a second view including a second physical object that is not in the first view, wherein the additional head-mounted device is within the first view; and
   a processor configured to:
      receive, from the additional head-mounted device, the data, the data being based on the second view; and
      determine a characteristic of the first physical object based on the first view captured by the camera and the data from the additional head-mounted device;
      transmit, to the additional head-mounted device, a signal indicating the characteristic of the first physical object;
      operate the display to output a virtual object as a substitute for the first physical object based on the characteristic of the first physical object;
      output a representation of the second physical object based on the data received from the additional head-mounted device; and
      determine whether, based on the first view, the additional camera is arranged to capture the second view of the first physical object.

2. The head-mounted device of claim 1, wherein the characteristic comprises an identity of the first physical object.

3. The head-mounted device of claim 1, wherein the processor is further configured to:
   determine whether the additional camera of the additional head-mounted device is arranged to capture the second view of the first physical object; and
   transmit, with the communication element and to the additional head-mounted device, a request for the data based on the second view captured by the additional camera.

4. The head-mounted device of claim 1, wherein the processor is further configured to:
   receive, with the communication element, arrangement information of the additional head-mounted device; and
   determine whether, based on the arrangement information, the additional camera is arranged to capture the second view of the first physical object is.

5. A system comprising:
   the head-mounted device of claim 1;
   the additional head-mounted device; and
   an external device in communication with the head-mounted device and the additional head-mounted device.

6. The system of claim 5, wherein the data is transmitted from the additional head-mounted device to the head-mounted device via the external device, and the signal is transmitted from the head-mounted device to the additional head-mounted device via the external device.

7. The system of claim 5, wherein the external device is configured to:
   determine an additional characteristic of the first physical object based on the first view and the data; and
   transmit, to the head-mounted device and the additional head-mounted device, an additional signal indicating the additional characteristic of the first physical object.

8. The system of claim 5, wherein the external device is configured to:
   receive the data from the additional head-mounted device;
   store the data until the camera captures the first view including the first physical object; and
   transmit the data to the head-mounted device.

9. A head-mounted device comprising:
   a camera for capturing a first view including a first physical object;
   a display; and
   a processor configured to:
      receive, with a communication element and from an additional head-mounted device, data based on a second view captured by an additional camera of the additional head-mounted device, the second view including the first physical object and a second physical object, the second physical object not being in the first view;
      determine a characteristic of the first physical object based on the first view captured by the camera and the data from the additional head-mounted device;
      transmit, with the communication element and to the additional head-mounted device, a signal indicating the characteristic of the first physical object;
      operate the display to output the first view with a virtual object that replaces the first physical object in the first view, the virtual object being based on the characteristic of the first physical object;

output a representation of the second physical object based on the data received from the additional head-mounted device;

determine whether the additional camera of the additional head-mounted device is arranged to capture the second view of the first physical object; and transmit, with the communication element and to the additional head-mounted device, a request for the data.

10. The head-mounted device of claim 9, wherein:
the additional head-mounted device is within the first view; and
the processor is further configured to determine whether, based on the first view, the additional camera is arranged to capture the second view of the first physical object.

11. The head-mounted device of claim 9, wherein the processor is further configured to:
receive, with the communication element, arrangement information of the additional head-mounted device; and
determine whether, based on the arrangement information, the additional camera is arranged to capture the second view of the first physical object is.

12. The head-mounted device of claim 9, wherein the characteristic comprises an identity of the first physical object.

13. A system comprising:
the head-mounted device of claim 9;
the additional head-mounted device; and
an external device in communication with the head-mounted device and the additional head-mounted device.

14. The system of claim 13, wherein the data is transmitted from the additional head-mounted device to the head-mounted device via the external device, and the signal is transmitted from the head-mounted device to the additional head-mounted device via the external device.

15. A head-mounted device comprising:
a camera;
a display;
a communication element; and
a processor configured to:
capture a first view of a first physical object with the camera;
receive, with the communication element, data from an additional head-mounted device comprising an additional camera, the data being based on a second view of the first physical object captured by the additional camera, the second view further including a second physical object that is not in the first view;
determine a characteristic of the first physical object based on the first view and the data;
transmit, with the communication element and to the additional head-mounted device, a signal indicating the characteristic of the first physical object;
operate the display to output a virtual object as a substitute for the first physical object based on the characteristic of the first physical object; and
output a representation of the second physical object based on the data received from the additional head-mounted device; and
receive, with the communication element, arrangement information of the additional head-mounted device; and
determine whether, based on the arrangement information, the additional camera is arranged to capture the second view of the first physical object.

16. The head-mounted device of claim 15, wherein the characteristic comprises an identity of the first physical object.

17. The head-mounted device of claim 15, wherein the processor is further configured to:
determine whether the additional camera of the additional head-mounted device is arranged to capture the second view of the first physical object; and
transmit, with the communication element and to the additional head-mounted device, a request for the data based on the second view captured by the additional camera.

* * * * *

UNITED STATES PATENT AND TRADEMARK OFFICE
CERTIFICATE OF CORRECTION

PATENT NO. : 12,001,751 B2  
APPLICATION NO. : 18/214448  
DATED : June 4, 2024  
INVENTOR(S) : Marinus Meursing et al.

Page 1 of 1

It is certified that error appears in the above-identified patent and that said Letters Patent is hereby corrected as shown below:

In the Claims

Column 20, Line 23 (Claim 4): "second view of the first physical object is." should read --second view of the first physical object.--;

Column 21, Line 26 (Claim 11): "second view of the first physical object is." should read --second view of the first physical object.--.

Signed and Sealed this  
Twenty-fifth Day of February, 2025

Coke Morgan Stewart  
*Acting Director of the United States Patent and Trademark Office*